United States Patent
Tollefson et al.

(10) Patent No.: US 9,563,668 B2
(45) Date of Patent: Feb. 7, 2017

(54) EXECUTING A BATCH PROCESS ON A REPOSITORY OF INFORMATION BASED ON AN ANALYSIS OF THE INFORMATION IN THE REPOSITORY

(75) Inventors: Lynda Tollefson, Orlando, FL (US); Nagaraj M. Hunur, Madhapur (IN); Balamurali Manyam, Kondapur (IN); Prasad Bodla, Foster City, CA (US); Ashton Kawanishi, Redwood City, CA (US)

(73) Assignee: Oracle International Corporation, Redwood Shores, CA (US)

( * ) Notice: Subject to any disclaimer, the term of this patent is extended or adjusted under 35 U.S.C. 154(b) by 1570 days.

(21) Appl. No.: 12/339,673

(22) Filed: Dec. 19, 2008

(65) Prior Publication Data

US 2010/0162246 A1     Jun. 24, 2010

(51) Int. Cl.
*G06F 17/30* (2006.01)

(52) U.S. Cl.
CPC ... *G06F 17/30539* (2013.01); *G06F 17/30554* (2013.01)

(58) Field of Classification Search
CPC .............................. G06F 17/30286–17/30737
See application file for complete search history.

(56) References Cited

U.S. PATENT DOCUMENTS

| | | | |
|---|---|---|---|
| 5,584,024 A * | 12/1996 | Shwartz | |
| 6,562,077 B2 * | 5/2003 | Bobrow et al. | 715/204 |
| 2002/0178394 A1 * | 11/2002 | Bamberger et al. | 714/1 |
| 2005/0223026 A1 * | 10/2005 | Chaudhuri et al. | 707/103 R |
| 2006/0074862 A1 * | 4/2006 | Redburn | 707/3 |
| 2007/0143255 A1 * | 6/2007 | Mathur et al. | 707/3 |
| 2007/0156658 A1 * | 7/2007 | Riley | 707/3 |
| 2008/0104529 A1 * | 5/2008 | Cravens et al. | 715/764 |

* cited by examiner

*Primary Examiner* — Keith Vicary
(74) *Attorney, Agent, or Firm* — Kilpatrick Townsend & Stockton LLP

(57) ABSTRACT

Embodiments of the invention provide for executing a batch process on a repository of information. According to one embodiment, executing a batch process can comprise presenting one or more aspects of records of the repository and receiving a selection of a criteria for at least one aspect of the records. Records matching the selected criteria can be identified and a summary of the information can be presented. The batch process can comprise one of a plurality of batch processes. In such a case, a selection of the batch process can be received and parameters of the batch process can be populated with the selected criteria. The batch process can then be executed with the parameters. For example, executing the batch process can comprise generating a report based on the parameters and the records of the repository.

12 Claims, 8 Drawing Sheets

EXECUTING A BATCH PROCESS ON A REPOSITORY OF INFORMATION BASED ON AN ANALYSIS OF THE INFORMATION IN THE REPOSITORY

BACKGROUND OF THE INVENTION

The present invention relates generally to processing information in a data repository, and more specifically to executing a batch process on a database or other repository of information based on an analysis of the information in the repository.

A large repository of information can be acted upon or processed in different ways. For example, batch processes can be executed on or using the information of the repository to generate reports or perform other processes. However, as the size of the repository increases, i.e., the amount of information acted upon by the batch process increases, the time and overhead required to perform the process increases. For a very large repository, the time required for the process may be many hours. Furthermore, many such processes require selection or designation of one or more parameters used by the process. The parameters can designate, for example, ranges or types of information to be processed, processes to be performed, etc. If the wrong process is executed or executed with the wrong parameters, the time and overhead required to perform the process may result in a report or other result that is not what is desired or expected and may not be useful to the party executing the process. Thus the time and overhead required to perform the process are essentially wasted.

Currently, to avoid such wasted efforts, a party executing the process can rely on expert knowledge of the information in the repository. For example, an administrator or operator executing the process can have a detailed level of knowledge of the information and/or the population, processes, etc. that the information represents. Thus, the administrator or operator can designate parameters based on this knowledge to obtain the results desired. However, such a level of knowledge is not always available and is subject to being lost if the expert employee leaves. Another approach is to manually execute a series of queries against the repository to gain insight into the information therein prior to executing the process. However, such an approach requires that the queries be correctly targeted in order to provide results that are useful in selecting specific parameters. Thus, this approach still relies on some level of expert knowledge of the information and/or processes. Furthermore, since such an approach relies on manually specifying and executing the queries, it is not useful or efficient for performing a "what if," type of analysis. Additionally, this approach does not provide an overall view or summary of the contents of the repository. Hence, there is a need for improved methods and systems for executing a batch process on a database or other repository of information.

BRIEF SUMMARY OF THE INVENTION

Embodiments of the invention provide systems and methods for executing a batch process on a database or other repository of information. According to one embodiment, a method of executing a batch process on a plurality of records in a corpus of information can comprise presenting one or more aspects of the plurality of records. The one or more aspects can comprise a general category for representing records of the plurality of records. Each aspect can comprise one or more criteria. The one or more criteria comprises a specific sub-category for representing records in each category.

A selection of a criteria for at least one aspect of the plurality of records can be received. One or more records of the plurality of records matching each of the selected criteria can be identified and a summary of the corpus of information can be presented based on the identified one or more records. For example, presenting the summary of the corpus of information based on the selected criteria can comprise displaying a graph enumerating records matching the selected criteria.

The batch process can comprise one of a plurality of batch processes. In such a case, a selection of the batch process can be received and, in response to the selection, one or more parameters of the batch process can be populated with the selected criteria. For example, the batch process can comprise a script such as a Structured Query Language (SQL) or other script including one or more variables. Values for the one or more variables can be passed to the script via the one or more parameters. The batch process can be executed with the one or more parameters. For example, executing the batch process can comprise generating a report based on the one or more parameters and the plurality of records.

According to another embodiment, a system can comprise a database containing a corpus of information. The corpus of information can include a plurality of records. A processor can be communicatively coupled with the repository. A memory can be communicatively coupled with and readable by the processor. The memory can have stored therein a series of instructions which, when executed by the processor, cause the processor to present one or more aspects of the plurality of records. The one or more aspects can comprise a general category for representing records of the plurality of records. Each aspect can comprise one or more criteria. The one or more criteria comprises a specific sub-category for representing records in each category.

A selection of a criteria for at least one aspect of the plurality of records can be received. One or more records of the plurality of records matching each of the selected criteria can be identified and a summary of the corpus of information can be presented based on the identified one or more records. For example, presenting the summary of the corpus of information based on the selected criteria can comprise displaying a graph enumerating records matching the selected criteria.

The batch process can comprise one of a plurality of batch processes. In such a case, a selection of the batch process can be received and, in response to the selection, one or more parameters of the batch process can be populated with the selected criteria. For example, the batch process can comprise a script such as a Structured Query Langauge (SQL) or other script including one or more variables. Values for the one or more variables can be passed to the script via the one or more parameters. The batch process can be executed with the one or more parameters. For example, executing the batch process can comprise generating a report based on the one or more parameters and the plurality of records.

According to yet another embodiment, a machine-readable medium can have stored thereon a series of instructions which, when executed by a processor, cause the processor to execute a batch process on a plurality of records in a corpus of information by presenting one or more aspects of the plurality of records, each aspect comprising one or more criteria. The one or more aspects can comprise a general category for representing records of the plurality of records. Each aspect can comprise one or more criteria. The one or more criteria comprises a specific sub-category for representing records in each category.

A selection of a criteria for at least one aspect of the plurality of records can be received. One or more records of the plurality of records matching each of the selected criteria can be identified and a summary of the corpus of information can be presented based on the identified one or more records. For example, presenting the summary of the corpus of information based on the selected criteria can comprise displaying a graph enumerating records matching the selected criteria.

The batch process can comprise one of a plurality of batch processes. In such a case, a selection of the batch process can be received and, in response to the selection, one or more parameters of the batch process can be populated with the selected criteria. For example, the batch process can comprise a script such as a Structured Query Language (SQL) or other script including one or more variables. Values for the one or more variables can be passed to the script via the one or more parameters. The batch process can be executed with the one or more parameters. For example, executing the batch process can comprise generating a report based on the one or more parameters and the plurality of records.

DETAILED DESCRIPTION OF THE INVENTION

Figure 1:
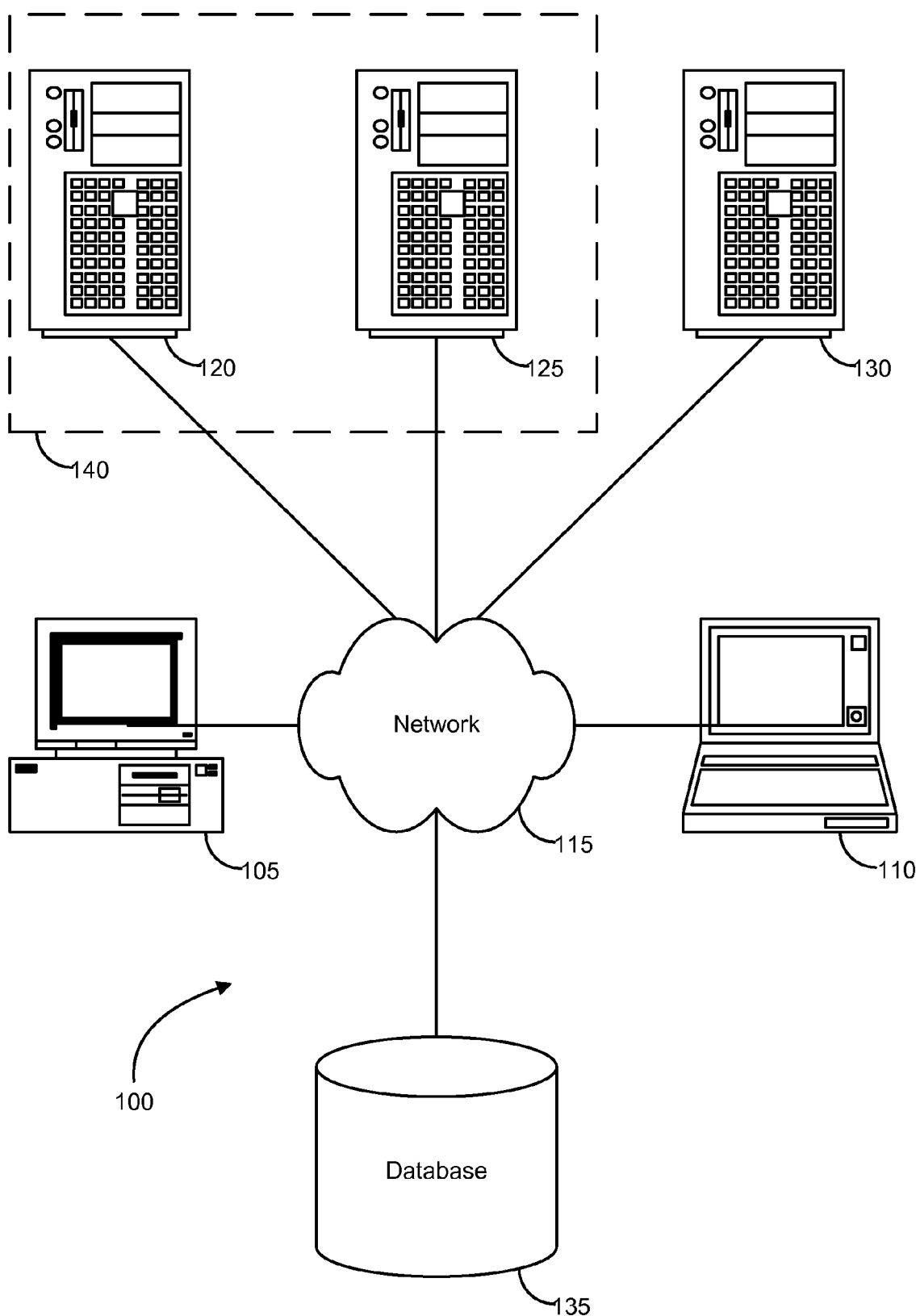
FIG. 1 is a block diagram illustrating components of an exemplary operating environment in which various embodiments of the present invention may be implemented.

In the following description, for the purposes of explanation, numerous specific details are set forth in order to provide a thorough understanding of various embodiments of the present invention. It will be apparent, however, to one skilled in the art that embodiments of the present invention may be practiced without some of these specific details. In other instances, well-known structures and devices are shown in block diagram form.

The ensuing description provides exemplary embodiments only, and is not intended to limit the scope, applicability, or configuration of the disclosure. Rather, the ensuing description of the exemplary embodiments will provide those skilled in the art with an enabling description for implementing an exemplary embodiment. It should be understood that various changes may be made in the function and arrangement of elements without departing from the spirit and scope of the invention as set forth in the appended claims.

Specific details are given in the following description to provide a thorough understanding of the embodiments. However, it will be understood by one of ordinary skill in the art that the embodiments may be practiced without these specific details. For example, circuits, systems, networks, processes, and other components may be shown as components in block diagram form in order not to obscure the embodiments in unnecessary detail. In other instances, well-known circuits, processes, algorithms, structures, and techniques may be shown without unnecessary detail in order to avoid obscuring the embodiments.

Also, it is noted that individual embodiments may be described as a process which is depicted as a flowchart, a flow diagram, a data flow diagram, a structure diagram, or a block diagram. Although a flowchart may describe the operations as a sequential process, many of the operations can be performed in parallel or concurrently. In addition, the order of the operations may be re-arranged. A process is terminated when its operations are completed, but could have additional steps not included in a figure. A process may correspond to a method, a function, a procedure, a subroutine, a subprogram, etc. When a process corresponds to a function, its termination can correspond to a return of the function to the calling function or the main function.

The term "machine-readable medium" includes, but is not limited to portable or fixed storage devices, optical storage devices, wireless channels and various other mediums capable of storing, containing or carrying instruction(s) and/or data. A code segment or machine-executable instructions may represent a procedure, a function, a subprogram, a program, a routine, a subroutine, a module, a software package, a class, or any combination of instructions, data structures, or program statements. A code segment may be coupled to another code segment or a hardware circuit by passing and/or receiving information, data, arguments, parameters, or memory contents. Information, arguments, parameters, data, etc. may be passed, forwarded, or transmitted via any suitable means including memory sharing, message passing, token passing, network transmission, etc.

Furthermore, embodiments may be implemented by hardware, software, firmware, middleware, microcode, hardware description languages, or any combination thereof. When implemented in software, firmware, middleware or microcode, the program code or code segments to perform the necessary tasks may be stored in a machine readable medium. A processor(s) may perform the necessary tasks.

Embodiments of the invention provide systems and methods for executing a batch process based on an analysis of the information that is the target of the process. That is, an analysis of information within a repository can be performed based on one or more aspects of the information and/or criteria for the aspect(s). An aspect can be considered a general category while a criteria can be considered a specific subcategory. The analysis can be performed based on a user selection of the aspect(s) and/or criteria, for example via a Graphical User Interface (GUI). A summary of the information, such as a chart or graph, can be presented, for example via the GUI, based on the analysis. If the user finds the summary to represent the information desired, useful, interesting, etc., the user can then request execution of the batch process based on the selected criteria. For example, the batch process may be a script such as a Structured Query Language (SQL) script that generates a report. In such a case, the criteria selected by the user can be passed as parameters to the script and the report can be generated for the specific categories or criteria selected.

Stated another way, executing a batch process on a plurality of records in a corpus of information can comprise presenting one or more aspects of the plurality of records. Each aspect can comprise one or more criteria. A selection of a criteria for at least one aspect of the plurality of records can be received. One or more records of the plurality of records matching each of the selected criteria can be identified and a summary of the corpus of information based on the identified one or more records can be presented. The batch process can comprise one of a plurality of batch processes. In such a case, a selection of the batch process can be received and in response to the selection, one or more parameters of the batch process can be populated with the selected criteria. The batch process can then be executed with the one or more parameters. For example, executing the batch process can comprise generating a report based on the one or more parameters and the plurality of records. Various additional details of embodiments of the present invention will be described below with reference to the figures.

FIG. 1 is a block diagram illustrating components of an exemplary operating environment in which various embodiments of the present invention may be implemented. The system 100 can include one or more user computers 105, 110, which may be used to operate a client, whether a dedicated application, web browser, etc. The user computers 105, 110 can be general purpose personal computers (including, merely by way of example, personal computers and/or laptop computers running various versions of Microsoft Corp.'s Windows and/or Apple Corp.'s Macintosh operating systems) and/or workstation computers running any of a variety of commercially-available UNIX or UNIX-like operating systems (including without limitation, the variety of GNU/Linux operating systems). These user computers 105, 110 may also have any of a variety of applications, including one or more development systems, database client and/or server applications, and web browser applications. Alternatively, the user computers 105, 110 may be any other electronic device, such as a thin-client computer, Internet-enabled mobile telephone, and/or personal digital assistant, capable of communicating via a network (e.g., the network 115 described below) and/or displaying and navigating web pages or other types of electronic documents. Although the exemplary system 100 is shown with two user computers, any number of user computers may be supported.

In some embodiments, the system 100 may also include a network 115. The network may be any type of network familiar to those skilled in the art that can support data communications using any of a variety of commercially-available protocols, including without limitation TCP/IP, SNA, IPX, AppleTalk, and the like. Merely by way of example, the network 115 maybe a local area network ("LAN"), such as an Ethernet network, a Token-Ring network and/or the like; a wide-area network; a virtual network, including without limitation a virtual private network ("VPN"); the Internet; an intranet; an extranet; a public switched telephone network ("PSTN"); an infra-red network; a wireless network (e.g., a network operating under any of the IEEE 802.11 suite of protocols, the Bluetooth protocol known in the art, and/or any other wireless protocol); and/or any combination of these and/or other networks such as GSM, GPRS, EDGE, UMTS, 3G, 2.5 G, CDMA, CDMA2000, WCDMA, EVDO etc.

The system may also include one or more server computers 120, 125, 130 which can be general purpose computers and/or specialized server computers (including, merely by way of example, PC servers, UNIX servers, mid-range servers, mainframe computers, rack-mounted servers, etc.). One or more of the servers (e.g., 130) may be dedicated to running applications, such as a business application, a web server, application server, etc. Such servers may be used to process requests from user computers 105, 110. The applications can also include any number of applications for controlling access to resources of the servers 120, 125, 130.

The web server can be running an operating system including any of those discussed above, as well as any commercially-available server operating systems. The web server can also run any of a variety of server applications and/or mid-tier applications, including HTTP servers, FTP servers, CGI servers, database servers, Java servers, business applications, and the like. The server(s) also may be one or more computers which can be capable of executing programs or scripts in response to the user computers 105, 110. As one example, a server may execute one or more web applications. The web application may be implemented as one or more scripts or programs written in any programming language, such as Java™, C, C# or C++, and/or any scripting language, such as Perl, Python, or TCL, as well as combinations of any programming/scripting languages. The server(s) may also include database servers, including without limitation those commercially available from Oracle®, Microsoft®, Sybase®, IBM® and the like, which can process requests from database clients running on a user computer 105, 110.

In some embodiments, an application server may create web pages dynamically for displaying on an end-user (client) system. The web pages created by the web application server may be forwarded to a user computer 105 via a web server. Similarly, the web server can receive web page requests and/or input data from a user computer and can forward the web page requests and/or input data to an application and/or a database server. Those skilled in the art will recognize that the functions described with respect to various types of servers may be performed by a single server and/or a plurality of specialized servers, depending on implementation-specific needs and parameters.

The system 100 may also include one or more databases 135. The database(s) 135 may reside in a variety of locations. By way of example, a database 135 may reside on a storage medium local to (and/or resident in) one or more of the computers 105, 110, 120, 125, 130. Alternatively, it may be remote from any or all of the computers 105, 110, 120, 125, 130, and/or in communication (e.g., via the network 120) with one or more of these. In a particular set of embodiments, the database 135 may reside in a storage-area network ("SAN") familiar to those skilled in the art. Similarly, any necessary files for performing the functions attributed to the computers 105, 110, 120, 125, 130 may be stored locally on the respective computer and/or remotely, as appropriate. In one set of embodiments, the database 135 may be a relational database, such as Oracle 10g, that is adapted to store, update, and retrieve data in response to SQL-formatted commands.

Figure 2:
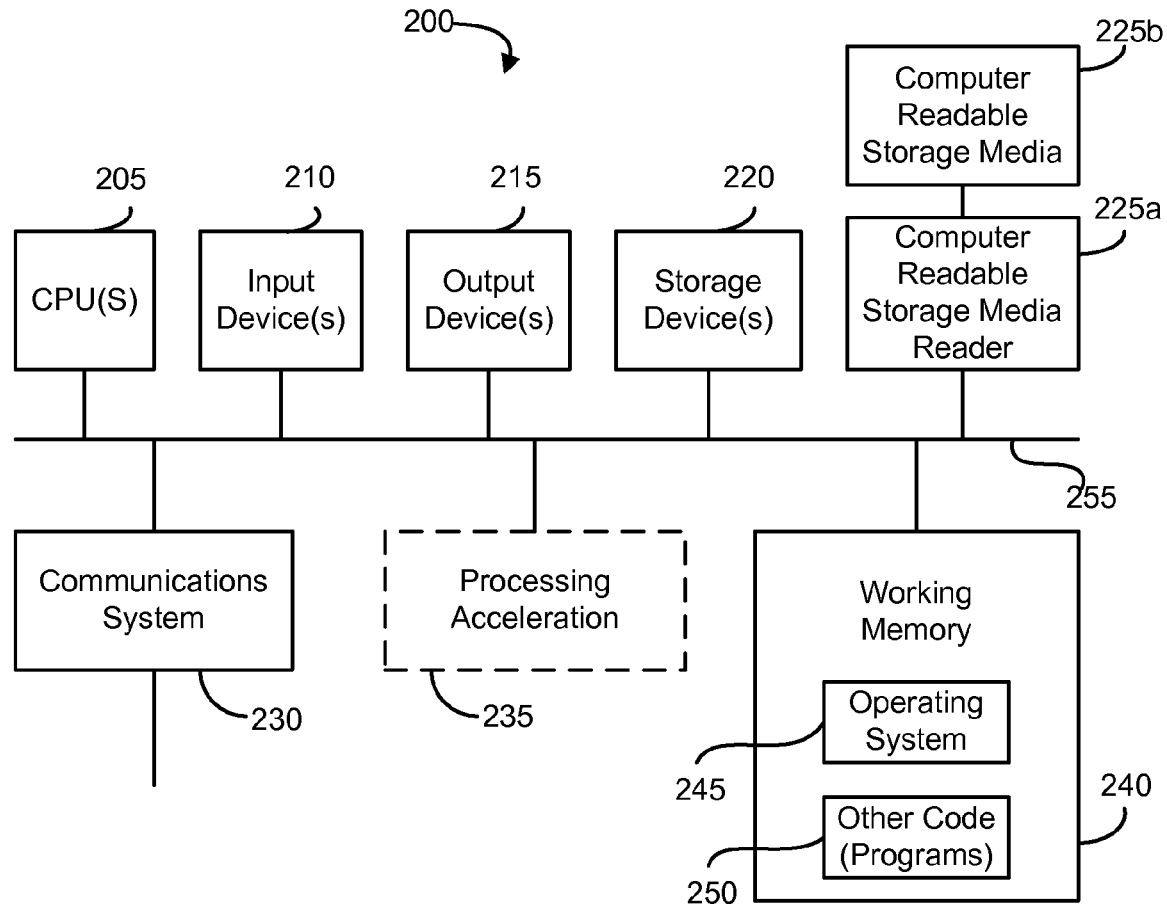
FIG. 2 is a block diagram illustrating an exemplary computer system in which embodiments of the present invention may be implemented.

FIG. 2 illustrates an exemplary computer system 200, in which various embodiments of the present invention may be implemented. The system 200 may be used to implement any of the computer systems described above. The computer system 200 is shown comprising hardware elements that may be electrically coupled via a bus 255. The hardware elements may include one or more central processing units (CPUs) 205, one or more input devices 210 (e.g., a mouse, a keyboard, etc.), and one or more output devices 215 (e.g., a display device, a printer, etc.). The computer system 200 may also include one or more storage devices 220. By way of example, storage device(s) 220 may be disk drives, optical storage devices, solid-state storage device such as a random access memory ("RAM") and/or a read-only memory ("ROM"), which can be programmable, flash-updateable and/or the like.

The computer system 200 may additionally include a computer-readable storage media reader 225*a*, a communications system 230 (e.g., a modem, a network card (wireless or wired), an infra-red communication device, etc.), and working memory 240, which may include RAM and ROM devices as described above. In some embodiments, the computer system 200 may also include a processing acceleration unit 235, which can include a DSP, a special-purpose processor and/or the like.

The computer-readable storage media reader 225*a* can further be connected to a computer-readable storage medium 225*b*, together (and, optionally, in combination with storage device(s) 220) comprehensively representing remote, local, fixed, and/or removable storage devices plus storage media for temporarily and/or more permanently containing computer-readable information. The communications system 230 may permit data to be exchanged with the network 220 and/or any other computer described above with respect to the system 200.

The computer system 200 may also comprise software elements, shown as being currently located within a working memory 240, including an operating system 245 and/or other code 250, such as an application program (which may be a client application, web browser, mid-tier application, RDBMS, etc.). It should be appreciated that alternate embodiments of a computer system 200 may have numerous variations from that described above. For example, customized hardware might also be used and/or particular elements might be implemented in hardware, software (including portable software, such as applets), or both. Further, connection to other computing devices such as network input/output devices may be employed. Software of computer system 200 may include code 250 for implementing embodiments of the present invention as described herein.

As noted above, embodiments of the present invention are directed to systems and methods for executing a batch process based on an analysis of the information that is the target of the process. That is, an analysis of information within a repository can be performed based on one or more aspects of the information and/or criteria for the aspect(s). An aspect can be considered a general category while a criteria can be considered a specific, subcategory. The analysis can be performed based on a user selection of the aspect(s) and/or criteria. A summary of the information, such as a chart or graph, can be presented based on the analysis. If the user finds the summary to represent the information desired, useful, interesting, etc., the user can then request execution of the batch process based on the selected criteria. For example, the batch process may be a script such as a Structured Query Language (SQL) script that generates a report. In such a case, the criteria selected by the user can be passed as parameters to the script and the report can be generated for the specific categories selected.

Figure 3:
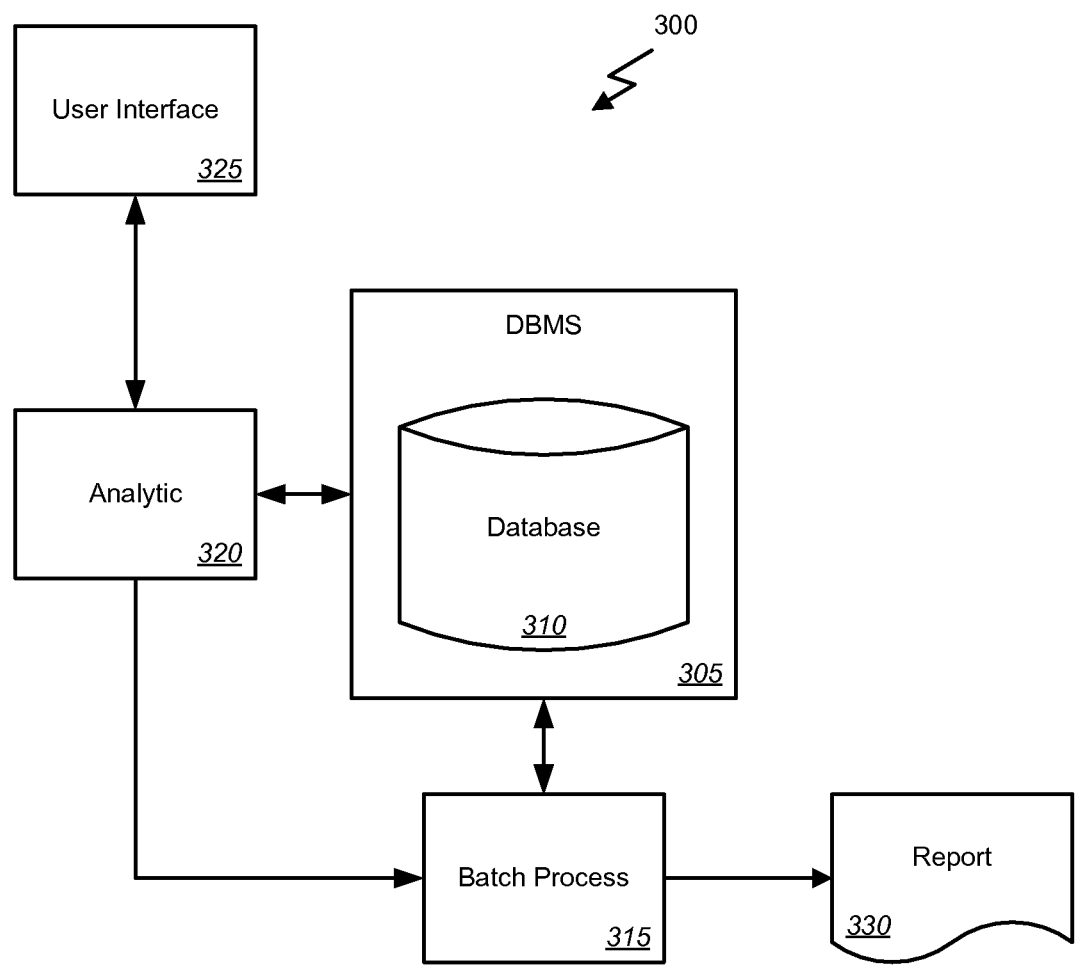
FIG. 3 is a block diagram illustrating, at a high-level, functional components of a system for executing a batch process based on an analysis of the target of the process according to one embodiment of the present invention.

FIG. 3 is a block diagram illustrating, at a high-level, functional components of a system for executing a batch process based on an analysis of the target of the process according to one embodiment of the present invention. In this example, the system 300 includes a database 310 or other repository of information such as introduced above. The database 310 can be maintained by and accessible through a DataBase Management System (DBMS) 305 as known in the art. A batch process 315 can be communicatively coupled with the database 310 and/or DBMS 305. The batch process 315 can comprise a script, or series of scripts, such as a Structured Query Language (SQL) or other script to be executed by the DBMS 305 on the database 310. Such a script can accept one or more parameters that can designate, for example, ranges or types of information to be processed, processes to be performed, etc. When executed, the batch process 315 can produce a report 330 of the information in the database 310 based on the parameters received. Additionally, or alternatively, the batch process can produce other results. For example, the batch process may update or otherwise manipulate one or more records and/or tables in the database 310. Other processes are contemplated and considered to be within the scope of the present invention.

It should be understood that, while only one batch process is indicated here for the sake of simplicity, embodiments of the present invention are not limited to use with only one batch process. Rather, multiple batch processes may be available and can be selected for execution by the user as will be described below. Also, it should be understood that embodiments of the present invention are not limited to use with one database or repository. Rather, multiple related or independent databases or repositories may be used.

The system can also include an analytic module 320 communicatively coupled with the database 310 and/or DBMS 305. As will be described, the analytic module 320 can present a user interface 325, such as a Graphical User Interface (GUI) for example, through which an administrator or other user can designate criteria for one or more aspects of the information in the database 310 that may be of interest. An aspect can be considered a general category while a criteria can be considered a specific subcategory. The analytic module 320 can perform an analysis of the information within the database 310 based on one or more aspects of the information and/or criteria for the aspect(s). According to one embodiment, the analytic module 320 can comprise and/or can execute one or more queries to be run against the database 310. In some cases, the queries can comprise summations and groupings to provide results "rolled-up" as desired. According to one embodiment, if the database 310 is very large, the queries can be run against one or more periodically updated summary tables of the database 310. A summary of the information, such as a chart or graph, can be presented, for example via the interface 325, based on the analysis. If the user finds the summary to represent the information desired, useful, interesting, etc., the user can then, via the interface 325, request execution of the batch process 315 based on the selected criteria. As noted above, the batch process 315 may be a script such as a SQL script that that accepts one or more parameters and generates a report of the information in the database 310 based on the parameters. In such a case, the analytic module 320 can pass the criteria selected by the user to the batch process 315 as parameters to the script and the batch process 315 can generate the report 330 for the specific categories or criteria selected.

Stated another way, the analytic module 320 can present one or more aspects of the plurality of records via an interface 325. The one or more aspects can comprise a general category for representing records of the plurality of records. Each aspect can comprise one or more criteria. The one or more criteria can comprise a specific sub-category for representing records in each category.

A selection of a criteria for at least one aspect of the plurality of records can be received by the analytic module 320 via the interface 325. One or more records of the plurality of records matching each of the selected criteria can be identified by the analytic module 320 and a summary of the corpus of information in the database 310 can be presented by the analytic module 320 via the user interface 325. The summary can be based on the identified one or more records. For example, presenting the summary of the corpus of information based on the selected criteria can comprise displaying a graph enumerating records matching the selected criteria.

As noted above, the batch process 315 can comprise one of a plurality of batch processes. In such a case, a selection of the batch process can be received by the analytic module 320 via the user interface 325. In response to the selection, one or more parameters of the batch process 315 can be populated with the selected criteria by the analytic module 320. For example, the batch process 315 can comprise a script such as an SQL or other script including one or more variables. Values for the one or more variables can be passed to the script by the analytic module 320 via the one or more parameters, e.g., passed by reference or value. The batch process 315 can be executed with the one or more parameters to generate a report 330 based on the one or more parameters and the plurality of records in the database 310.

Figure 4:
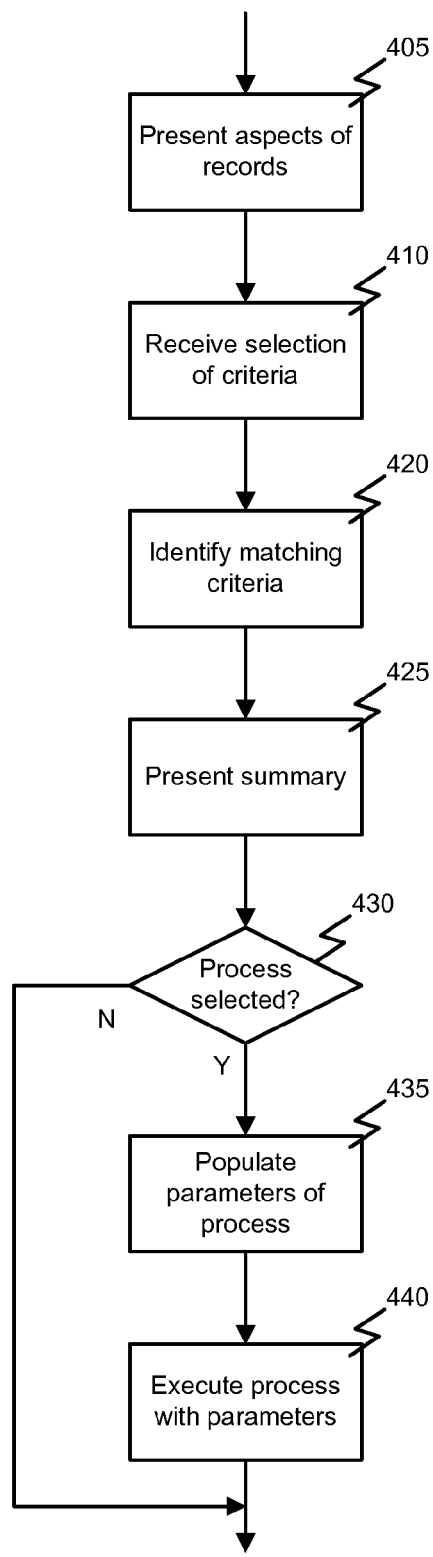
FIG. 4 is a flowchart illustrating a process for executing a batch process based on an analysis of the target of the process according to one embodiment of the present invention.

FIG. 4 is a flowchart illustrating a process for executing a batch process based on an analysis of the target of the process according to one embodiment of the present invention. More specifically, this example illustrates a process as may be performed by the analytic module described above. In this example, the process begins with presenting 405 one or more aspects of the plurality of records. The one or more aspects can comprise a general category for representing records of the plurality of records. Each aspect can comprise one or more criteria. The one or more criteria comprises a specific sub-category for representing records in each category.

A selection of a criteria for at least one aspect of the plurality of records can be received 410. One or more records of the plurality of records matching each of the selected criteria can be identified 420 and a summary of the corpus of information can be presented 425 based on the identified one or more records. For example, presenting 425 the summary of the corpus of information based on the selected criteria can comprise displaying a graph enumerating records matching the selected criteria.

A determination 430 can be made as to whether a batch process is selected or requested. In response to determining 430 a process is selected, one or more parameters of the batch process can be populated 435 with the selected criteria. For example, the batch process can comprise a script including one or more variables. Values for the one or more variables can be passed to the script via the one or more parameters. The batch process can be executed 440 with the one or more parameters. For example, executing 440 the batch process can comprise generating a report based on the one or more parameters and the plurality of records.

To further illustrate an implementation of embodiments of the present invention, a database maintaining information related to employee benefits will be considered. However, it should be understood that implementations of various embodiments of the present invention are not limit to managing employee benefits. Rather, embodiments of the present invention can be used in implementations related to managing healthcare information, financial information, scientific information, or any other application with large batch processes and/or processes operating on large repositories of information. Thus, the following examples describing an implementation related to managing employee benefits are provided by way of example only and are not intended to limit the scope of the present invention. Furthermore, the following description of exemplary user interfaces is provided for illustrative purposes only and are not intended to limit the scope of the present invention. It should be understood that various other graphical and non-graphical user interfaces with various other formats, content, etc can be implemented. These variations are contemplated and considered to be within the scope of the present invention.

Figure 5:
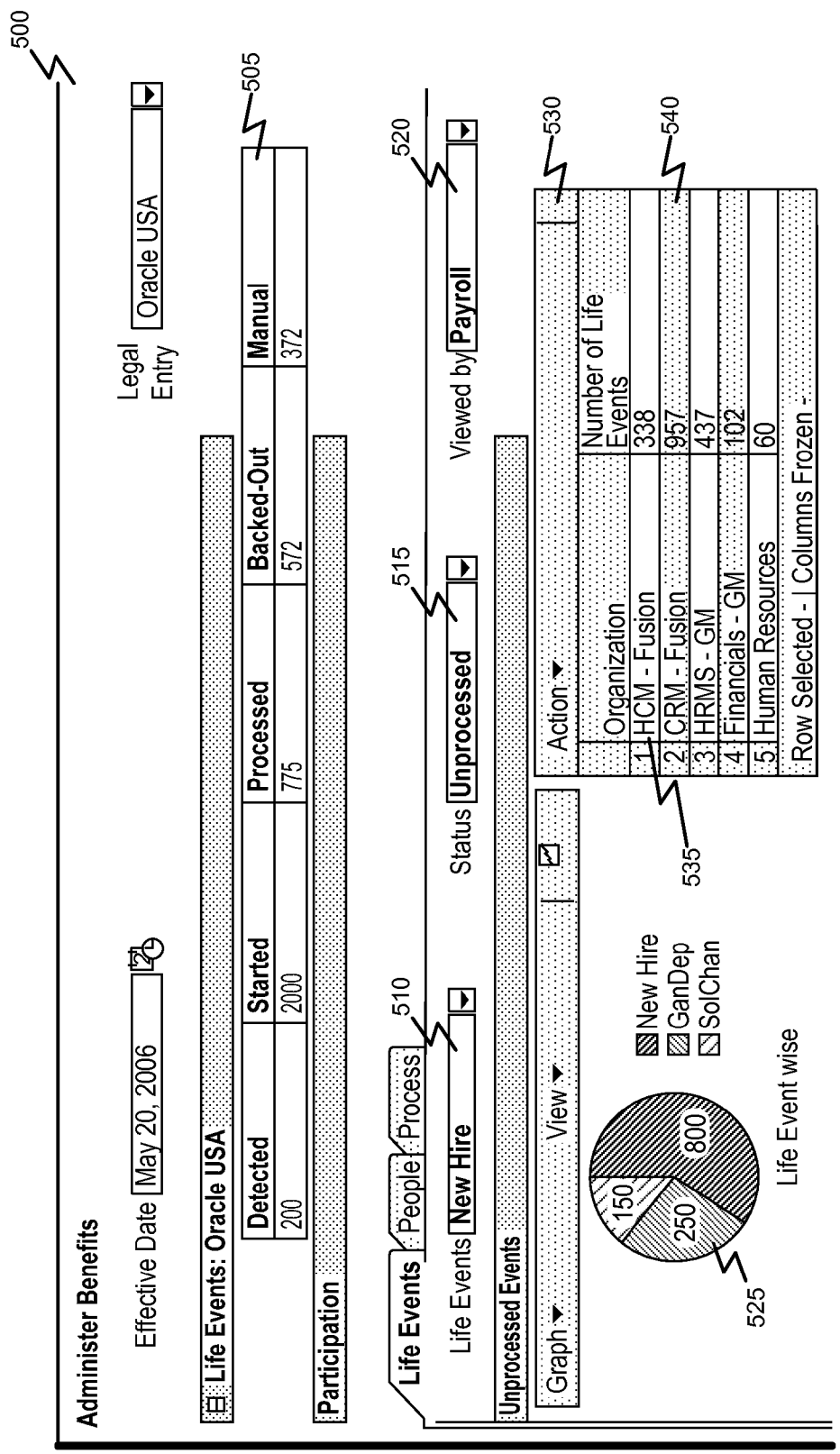
FIG. 5 is a screenshot illustrating an exemplary interface of an analytic module according to one embodiment of the present invention.

FIG. 5 is a screenshot illustrating an exemplary interface of an analytic module according to one embodiment of the present invention. In this example, the interface comprises a page 500 such as a web page that may be rendered by a browser or other application as known in the art. The page 500 can include a number of graphical and/or textual elements 505-540 for presenting information related to the information in the repository, indicating and receiving user selection of criteria for various aspects of the information, providing a summary of the information, etc.

For example, the page 500 can include a set of textboxes 505 or other elements for indicating statuses of stages in a process, e.g., benefits enrollment, and the number of records at each of those stages. The page 500 can also include one or more combo-boxes 510, 515, and 520 or other elements related to one or more aspects of the information in the repository. As will be described below with reference to FIGS. 6-8, these combo-boxes 510, 515, and 520 can provide lists of criteria for each of the aspects from which the user may select. The interface page 500 can also include a graph 525 or other summary of the information based on a selected criteria. The summary can additionally or alternatively include a table 530. The table 530 can include, for example, a list of reports 535 and a corresponding number of records 540 in the information of the repository related to that report. According to one embodiment, each entry in the list of reports 535 can comprise a link to a batch process associated with that report. In such cases, the user may select an initiate a report, with the currently selected criteria from combo-boxes 510, 515, and 520, by clicking or otherwise selecting the link from the list of reports 535.

Figure 6:
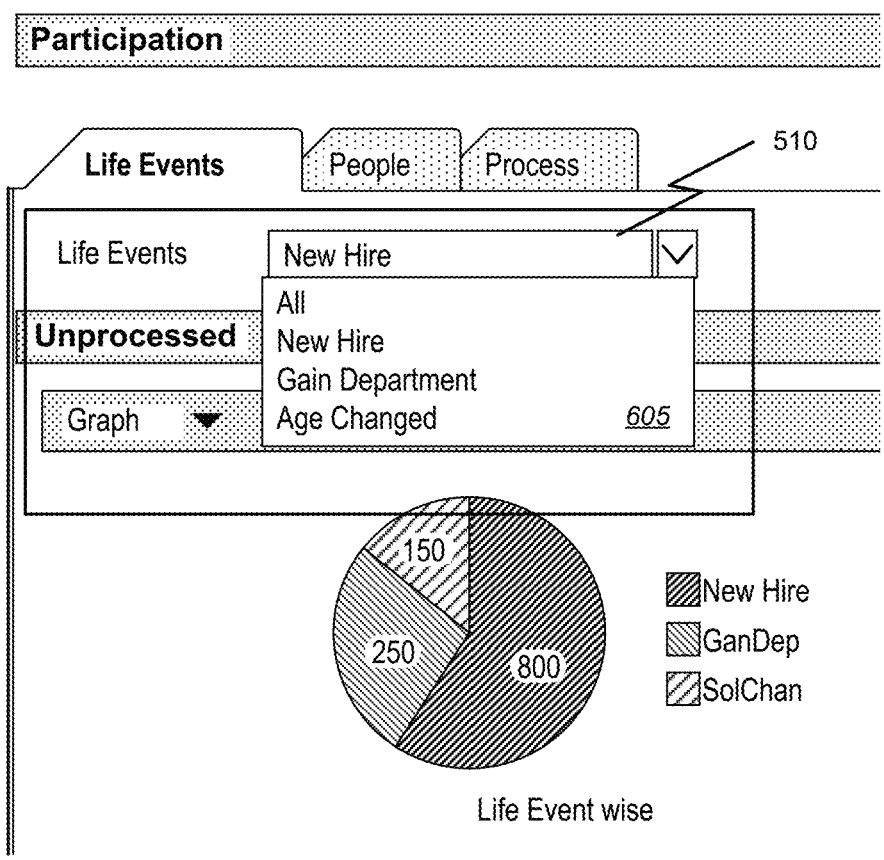
FIG. 6 is a screenshot illustrating additional details of the interface of FIG. 5 according to one embodiment of the present invention.

FIG. 6 is a screenshot illustrating additional details of the interface of FIG. 5 according to one embodiment of the present invention. More specifically, this example illustrates the first combo-box 510 introduced above. In this example, the combo-box 510 relates to the "Life Event" aspect of the information of the repository, i.e., those employees that have had a qualifying event during the past year, enrollment period, etc. Also in this example, the combo-box 510 control has been selected to cause display of the various criteria 605 related to this aspect. More specifically, the criteria 605 for the "Life Event" aspect can be, for example, "New Hire," "Gain Dependent," "Age Changed," and/or other criteria related to the "Life Event" aspect and relevant to the benefits administration process. The user of the interface can then move the cursor or pointer by manipulating a mouse, keyboard, or other input device, to select the desired criteria. The summary information described above can then be updated to reflect the selected criteria.

Figure 7:
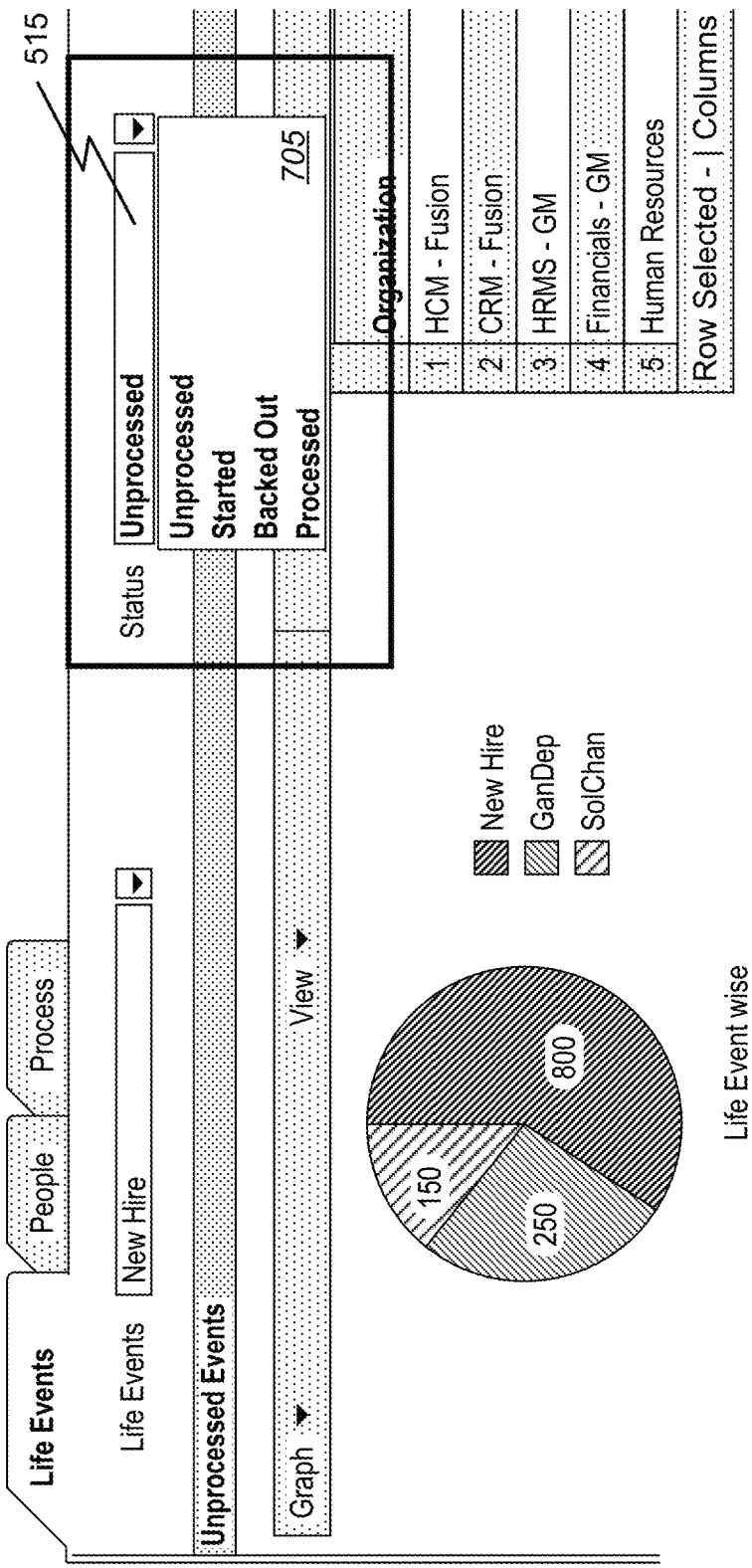
FIG. 7 is a screenshot illustrating additional details of the interface of FIG. 5 according to one embodiment of the present invention.

FIG. 7 is a screenshot illustrating additional details of the interface of FIG. 5 according to one embodiment of the present invention. More specifically, this example illustrates the second combo-box 515 introduced above. In this example, the combo-box 515 relates to the "Status" aspect of the information of the repository, i.e., state or stage in a process, e.g., benefits enrollment. Also in this example, the combo-box 515 control has been selected to cause display of the various criteria 705 related to this aspect. More specifically, the criteria 705 for the "Status" aspect can be, for example, "Unprocessed," "Started," "Backed Out," "Processed," and/or other criteria related to the "Status" aspect and relevant to the benefits administration process. The user of the interface can then move the cursor or pointer by manipulating a mouse, keyboard, or other input device, to select the desired criteria. The summary information described above can then be updated to reflect the selected criteria.

Figure 8:
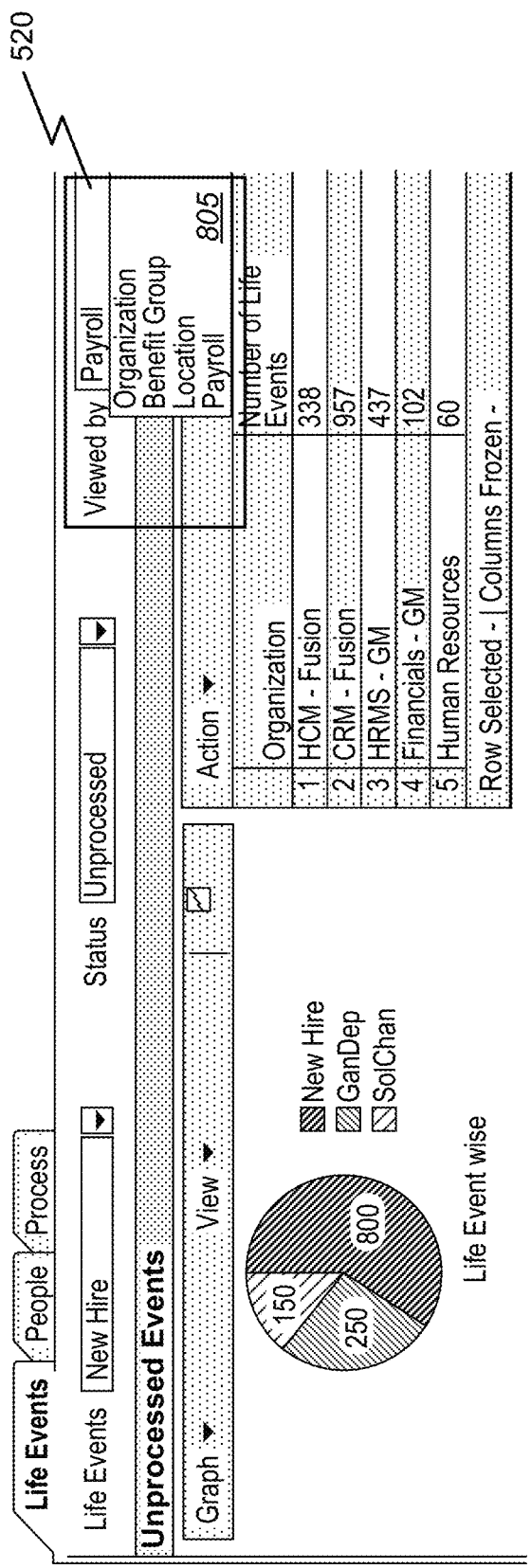
FIG. 8 is a screenshot illustrating additional details of the interface of FIG. 5 according to one embodiment of the present invention.

FIG. 8 is a screenshot illustrating additional details of the interface of FIG. 5 according to one embodiment of the present invention. More specifically, this example illustrates the third combo-box 520 introduced above. In this example, the combo-box 520 relates to the "View by" aspect of the information of the repository, i.e., groups or categories of employees. Also in this example, the combo-box 520 control has been selected to cause display of the various criteria 805 related to this aspect. More specifically, the criteria 805 for the "View by" aspect can be, for example, "Organization," "Benefit Group," "Location," "Payroll," and/or other criteria related to the "View by" aspect and relevant to the benefits administration process. The user of the interface can then move the cursor or pointer by manipulating a mouse, keyboard, or other input device, to select the desired criteria. The summary information described above can then be updated to reflect the selected criteria.

In the foregoing description, for the purposes of illustration, methods were described in a particular order. It should be appreciated that in alternate embodiments, the methods may be performed in a different order than that described. It should also be appreciated that the methods described above may be performed by hardware components or may be embodied in sequences of machine-executable instructions, which may be used to cause a machine, such as a general-purpose or special-purpose processor or logic circuits programmed with the instructions to perform the methods. These machine-executable instructions may be stored on one or more machine readable mediums, such as CD-ROMs or other type of optical disks, floppy diskettes, ROMs, RAMs, EPROMs, EEPROMs, magnetic or optical cards, flash memory, or other types of machine-readable mediums suitable for storing electronic instructions. Alternatively, the methods may be performed by a combination of hardware and software.

While illustrative and presently preferred embodiments of the invention have been described in detail herein, it is to be understood that the inventive concepts may be otherwise variously embodied and employed, and that the appended claims are intended to be construed to include such variations, except as limited by the prior art.

What is claimed is:

1. A method of executing a batch process on a plurality of records in a database, the method comprising:
   presenting, by a computer system, a plurality of aspects of the plurality of records, each aspect defining a general category of information in the plurality of records and comprising one or more criteria, each of the one or more criteria defining a specific sub-category of information in the plurality of records;
   receiving, by the computer system, a selection of a criterion of the one or more criteria for at least one aspect of the plurality of records;
   analyzing, by the computer system, the plurality of records to identify one or more records that match the selected criterion for each of at least one aspect of the plurality of records based on the selected criterion for each of at least one aspect of the plurality of records and aspects of the plurality of records before executing one or more of a plurality of batch processes, wherein the selected criterion for each of at least one aspect of the plurality of records and aspects of the plurality of records relate to one or more parameters of the one or more of the plurality of batch processes, and wherein analyzing the one or more records comprises executing one or more queries on one or more periodically updated summary tables of the database;
   presenting, by the computer system, a summary of the database based on the analysis of the plurality of records, wherein presenting the summary of the database based on the analysis of the plurality of records comprises providing a graph and a table, the graph providing a summary of information in the database based on the selected criterion for each of at least one aspect of the plurality of records and the table comprising a list of reports and a corresponding number of records in the database related to each report and wherein each entry in the list of reports comprises a link to a batch process associated with the report;
   receiving, by the computer system, a selection of a batch process from the plurality of batch processes;
   populating, by the computer system, the one or more parameters of the selected batch process with the selected criterion for each of at least one aspect of the plurality of records; and
   executing, by the computer system, the selected batch process with the populated one or more parameters.

2. The method of claim 1, wherein executing the selected batch process comprises generating a report based on the one or more parameters of the selected batch process and the plurality of records.

3. The method of claim 1, wherein the batch process comprises a script including one or more variables and wherein values for the one or more variables are passed to the script via the one or more parameters of the selected batch process.

4. The method of claim 3, wherein the script comprises a Structured Query Language (SQL) script.

5. A system comprising:
   a database including a plurality of records;
   a processor communicatively coupled with the database; and
   a memory communicatively coupled with and readable by the processor, the memory having stored therein a series of instructions which, when executed by the processor, causes the processor to:
   present a plurality of aspects of the plurality of records, each aspect defining a general category of information in the plurality of records and comprising one or more criteria, each of the one or more criteria defining a specific sub-category of information in the plurality of records;
   receive a selection of a criterion of the one or more criteria for at least one aspect of the plurality of records;
   analyze the plurality of records to identify one or more records that match the selected criterion for each of at least one aspect of the plurality of records based on the selected criterion for each of at least one aspect of the plurality of records and aspects of the plurality of records before executing one or more of a plurality of batch processes, wherein the selected criterion for each of at least one aspect of the plurality of records and aspects of the plurality of records relate to one or more parameters of the one or more of the plurality of batch processes, and wherein analyzing the one or more records comprises executing one or more queries on one or more periodically updated summary tables of the database;

present a summary of the database based on the analysis of the plurality of records, wherein presenting the summary of the database based on the analysis of the plurality of records comprises providing a graph and a table, the graph providing a summary of information in the database based on the selected criterion for each of at least one aspect of the plurality of records and the table comprising a list of reports and a corresponding number of records in the database related to each report and wherein each entry in the list of reports comprises a link to a batch process associated with the report;

receive a selection of a batch process from the plurality of batch processes;

populate the one or more parameters of the selected batch process with the selected criterion for each of at least one aspect of the plurality of records; and execute the selected batch process with the populated one or more parameters.

6. The system of claim 5, wherein executing the selected batch process comprises generating a report based on the one or more parameters of the selected batch process and the plurality of records.

7. The system of claim 5, wherein the batch process comprises a script including one or more variables and wherein values for the one or more variables are passed to the script via the one or more parameters of the selected batch process.

8. The system of claim 7, wherein the script comprises a Structured Query Language (SQL) script.

9. A non-transitory machine-readable medium having stored thereon a series of instructions which, when executed by a processor, causes the processor to execute a batch process on a plurality of records in a database by:

presenting a plurality of aspects of the plurality of records, each aspect defining a general category of information in the plurality of records and comprising one or more criteria, each of the one or more criteria defining a specific sub-category of information in the plurality of records;

receiving a selection of a criterion of the one or more criteria for at least one aspect of the plurality of records;

analyzing the plurality of records to identify one or more records that match the selected criterion for each of at least one aspect of the plurality of records based on the selected criterion for each of at least one aspect of the plurality of records and aspects of the plurality of records before executing one or more of a plurality of batch processes, wherein the selected criterion for each of at least one aspect of the plurality of records and aspects of the plurality of records relate to one or more parameters of the one or more of the plurality of batch processes, and wherein analyzing the one or more records comprises executing one or more queries on one or more periodically updated summary tables of the database, and wherein executing the one or more queries comprises providing summations of the database based on the selected criterion for each of at least one aspect of the plurality of records and aspects of the plurality of records;

presenting a summary of the database based on the analysis of the plurality of records, wherein presenting the summary of the database based on the analysis of the plurality of records comprises providing a graph and a table, the graph providing a summary of information in the database based on the selected criterion for each of at least one aspect of the plurality of records and the table comprising a list of reports and a corresponding number of records in the database related to each report and wherein each entry in the list of reports comprises a link to a batch process associated with the report;

receiving a selection of a batch process from the plurality of batch processes;

populating the one or more parameters of the selected batch process with the selected criterion for each of at least one aspect of the plurality of records; and executing the selected batch process with the populated one or more parameters.

10. The non-transitory machine-readable medium of claim 9, wherein executing the selected batch process comprises generating a report based on the one or more parameters of the selected batch process and the plurality of records.

11. The non-transitory machine-readable medium of claim 9, wherein the batch process comprises a script including one or more variables and wherein values for the one or more variables are passed to the script via the one or more parameters of the selected batch process.

12. The non-transitory machine-readable medium of claim 11, wherein the script comprises a Structured Query Language (SQL) script.

* * * * *

UNITED STATES PATENT AND TRADEMARK OFFICE
CERTIFICATE OF CORRECTION

| | | |
|---|---|---|
| PATENT NO. | : 9,563,668 B2 | |
| APPLICATION NO. | : 12/339673 | |
| DATED | : February 7, 2017 | |
| INVENTOR(S) | : Lynda Tollefson et al. | |

It is certified that error appears in the above-identified patent and that said Letters Patent is hereby corrected as shown below:

In the Specification

Column 1, Line 52, delete "if,"" and insert --if'--, therefore.

Column 2, Lines 38-58, delete "first" duplicate paragraph, therefore.

Column 3, Lines 3-23, delete "second" duplicate paragraph, therefore.

Column 8, Line 58, delete "that that" and insert --that--, therefore.

Signed and Sealed this
Tenth Day of July, 2018

Andrei Iancu
*Director of the United States Patent and Trademark Office*